Patented Nov. 16, 1948

2,454,261

UNITED STATES PATENT OFFICE 2,454,261

AMINOTRIAZINE AND DERIVATIVES

Henry A. Walter, Longmeadow, Mass., assignor to Monsanto Chemical Company, St. Louis, Mo., a corporation of Delaware No Drawing. Application January 19, 1946, Serial No. 642,434

2 Claims. (Cl. 260—249.5)

This invention relates to a new chemical compound, a method for preparing it and reaction products thereof. More specifically, the invention relates to 3,5-diamino-4-hydro thiotriazine-1-dioxide and to the reaction products thereof.

An object of this invention is to provide new chemical compositions.

A further object of this invention is to provide new aminoplasts.

Another object of this invention is to provide a method for the preparation of 3,5-diamino-4-hydro-thiotriazine-1-dioxide.

Still another object of this invention is to provide reaction products of 3,5-diamino-4-hydro thiotriazine-1-dioxide.

These and other objects are attained by reacting dicyandiamide with sulfamic acid, its salts or its esters to produce 3,5-diamino-4-hydro thiotriazine-1-dioxide and by further reacting this product as will be shown below.

The following examples are given in illustration and are not intended to limit the scope of this invention. Where parts are mentioned, they are parts by weight.

Example I 300 parts of anhydrous sulfamic acid (3 mols) and 255 parts of dicyandiamide (3 mols) were mixed, triturated, and then heated to about 120° C. at which temperature the mixture fused. Heating at about 120° C. was continued for about one hour whereupon the product was cooled and comminuted. The comminuted reaction product was extracted with large amounts of dilute aqueous sodium hydroxide and a precipitate obtained from the dilute solution by the addition of acetic acid. The precipitate thus obtained was a white, granular powder which, upon analysis, was found to be 3,5-diamino-4-hydro thiotriazine-1-dioxide. It was insoluble in water and dilute acid and soluble in dilute alkali.

The probable structural formula of the compound is

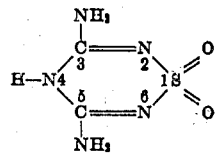

Example II 120 parts of dry sodium sulfamate (1 mol) and 85 parts of dicyandiamide (1 mol) were thoroughly blended and then heated to a temperature of 205–210° C. at which temperature the mixture fused. The mixture was further heated at 205–210° C. for about one hour, then cooled and dissolved in water. The reaction product was precipitated from the resulting solution with acetic acid and was found, on analysis, to be 3,5-diamino-4-hydro thiotriazine-1-dioxide.

Sulfamic acid and sodium sulfamate are shown in the examples as components for the reaction with dicyandiamide. They may be replaced, in part or in whole, by other sulfamic acid salts, e. g., ammonium, potassium, calcium, barium, etc., sulfamates, or by organic esters of sulfamic acid such as ethyl, propyl, butyl sulfamates, etc. The molar ratio of dicyandiamide to sulfamic acid, or sulfamic acid derivative, should be kept at about 1:1. A slight excess of either component leads to undesirable by-products which are difficult to separate from the desired 3,5-diamino-4-hydro thiotriazine-1-dioxide. A substantial excess of either component produces different and undesired products.

The temperature of the reaction will vary according to the nature of the sulfamic acid or its derivative which is used to react with the dicyandiamide. In each case, however, the temperature must be high enough to fuse the two components, but not high enough to cause decomposition of either component.

The length of the temperature treatment of the fused mixture will vary according to the temperature used. For example, if the fusion temperature of the mixture is used for the reaction, the reaction must be carried on for about one hour, but if temperatures higher than the fusion temperature are employed, the reaction time may be materially shortened.

It will be noted that the conditions shown in the examples are substantially anhydrous up to the completion of the reaction. It is necessary to maintain substantially anhydrous conditions since the presence of water along with sulfamic acid, or sulfamic acid derivative, would cause a breakdown of dicyandiamide and would yield sulfamic acid derivatives of dicyandiamide decomposition products rather than the compound of this invention.

Acetic acid was used in the examples to precipitate 3,5-diamino-4-hydro thiotriazine-1-dioxide from the alkaline solution. Other acids or acid producing materials, such as carbon dioxide, sulfur trioxide, hydrochloric acid, sulfuric acid, propionic acid, etc., may be used as the precipitating agent. The acidic precipitating agents must be used in amounts at least sufficient to render the solution slightly acid.

3,5-diamino-4-hydro thiotriazine-1-dioxide reacts with aldehydes to form extremely valuable resins. For example, it may be reacted with saturated or unsaturated aliphatic, alicyclic or aromatic aldehydes such as formaldehyde, acetaldehyde, propionaldehyde, butyraldehyde, benzaldehyde, cinnamaldehyde, furfural, acrolein, methacrolein, crotonaldehyde, etc., to form substances which range from water-soluble products to insoluble, infusible, hard resins.

*Example III*

126 parts of 3,5-diamino-4-hydro thiotriazine-1-dioxide were suspended in a mixture of 486 parts of formalin (37% formaldehyde) and 270 parts of methanol. The pH of the suspension was adjusted to about 8.3 with dilute potassium hydroxide. The suspension was then heated under refluxing conditions at atmospheric pressure for about one hour, during which time a clear solution was formed. The resultant solution was evaporated to remove methanol, water and excess formaldehyde to yield a slightly yellow fusible resin which, on further heating with or without catalyst, could be cured to an insoluble, infusible product.

The soluble, fusible resins produced by the reaction between aldehydes and 3,5-diamino-4-hydro thiotriazine-1-dioxide may be further modified by reaction with saturated or unsaturated aliphatic and aromatic alcohols such as methanol, ethanol, propanol, butanol, phenol, cresol, benzyl alcohol, allyl alcohol, etc.

*Example IV*

To the water-methanol solution of a formaldehyde 3,5-diamino-4-hydro thiotriazine-1-dioxide resin made as shown in Example III were added 500 parts of methanol and the solution was cooled to about 30° C. 60 cc. of concentrated sulfuric acid were added slowly while maintaining the 30° C. temperature. The solution was then heated to about 40° C. until it became clear, whereupon the temperature was again lowered to about 30° C. and the reaction continued for about one hour. The resultant solution was made alkaline to a pH of approximately 8.3 with potassium hydroxide. The solution was then filtered and evaporated under vacuum. A resinous material was produced which was soluble in water and aliphatic alcohols.

The alcohol-modified resins may be produced in a single step by refluxing 3,5-diamino-4-hydro thiotriazine-1-dioxide with the aldehyde and the alcohol in the presence of an acid catalyst.

The resins above described are disclosed and claimed in my copending application Serial No. 747,335 which is a continuation-in-part of this application.

The resins above described may be used for molding compositions, binders in adhesives, textile treating compositions, coating compositions, etc. They may be used alone or blended with various conventional ingredients such as cellulosic or mineral fillers, natural or synthetic resins, lubricants, dyes, pigments, etc. They may be cured to the insoluble, infusible state by the application of heat, with or without the addition of curing catalysts.

It is obvious that many variations may be made in the processes and products described above within the spirit and scope of the invention as defined in the appended claims.

What is claimed is:

1. 3,5-diamino-4-hydro thiotriazine-1-dioxide having the formula

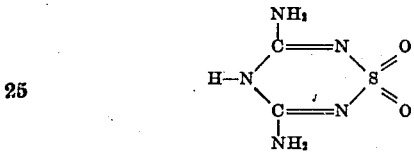

2. The process for preparing 3,5-diamino-4-hydro thiotriazine-1-dioxide having the formula

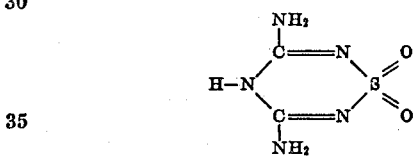

which comprises reacting together substantially equimolecular proportions of dicyandiamide and one of the group consisting of sulfamic acid, salts of sulfamic acid and esters of sulfamic acid, under substantially anhydrous conditions.

HENRY A. WALTER.

REFERENCES CITED

The following references are of record in the file of this patent:

UNITED STATES PATENTS

| Number | Name | Date |
|---|---|---|
| 2,317,738 | D'Alelio | Apr. 27, 1943 |
| 2,324,285 | D'Alelio | July 13, 1943 |